United States Patent
Porco et al.

(10) Patent No.: US 11,248,497 B2
(45) Date of Patent: Feb. 15, 2022

(54) GAS TURBINE ENGINE YOKE AND BUILD SUPPORT

(71) Applicant: PRATT & WHITNEY CANADA CORP., Longueuil (CA)

(72) Inventors: Carlo Porco, King City (CA); Geoffrey Henriksen, Mississauga (CA); Jason Wedemire, Erin (CA); Anthony Mathias, King Township (CA); David Nicol, Orangeville (CA); Filip Ristovski, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 210 days.

(21) Appl. No.: 16/398,824

(22) Filed: Apr. 30, 2019

(65) Prior Publication Data

US 2020/0347752 A1    Nov. 5, 2020

(51) Int. Cl.
*F01D 25/28* (2006.01)
*B25H 1/00* (2006.01)

(52) U.S. Cl.
CPC ......... *F01D 25/285* (2013.01); *B25H 1/0007* (2013.01); *F05D 2230/68* (2013.01)

(58) Field of Classification Search
CPC ........ B23Q 1/527; B23Q 1/52; B25H 1/0007; F01D 25/285
See application file for complete search history.

(56) References Cited

U.S. PATENT DOCUMENTS

| | | | |
|---|---|---|---|
| 2,586,263 A | 2/1952 | Rose | |
| 2,703,252 A | 3/1955 | Blackwell | |
| 2,825,477 A | 3/1958 | Ross | |
| 3,085,798 A | 4/1963 | Gavette | |
| 4,010,942 A | 3/1977 | Ward | |
| 4,200,273 A | 4/1980 | Das Gupta et al. | |
| 5,911,680 A | 6/1999 | Takeoka | |
| 9,309,008 B2 * | 4/2016 | Boulanger | B66F 9/06 |
| 9,597,758 B2 * | 3/2017 | Tayama | B23Q 3/04 |
| 9,982,568 B2 | 8/2018 | Reinhardt et al. | |
| 2018/0142576 A1 * | 5/2018 | Dervaux | F01D 25/285 |
| 2018/0311808 A1 | 11/2018 | Baucher et al. | |

FOREIGN PATENT DOCUMENTS

WO    WO2017/072449 A1    5/2017

OTHER PUBLICATIONS

European Search Report issued in EP counterpart application No. 20172547.0 dated Aug. 28, 2020.

\* cited by examiner

*Primary Examiner* — Tyrone V Hall, Jr.
(74) *Attorney, Agent, or Firm* — Norton Rose Fulbright Canada LLP

(57) ABSTRACT

A gas turbine engine yoke includes an arcuate body mountable to a stand and rotatable between an upright orientation and a horizontal orientation. The body has an inner wall spaced apart from an outer wall and first and second side walls extending between the inner and outer walls. A mounting plane of the yoke extends through the inner and outer walls and is positioned between the first and second side walls. Engine attachments are spaced apart along the inner wall and lie in the mounting plane. A method of assembling the gas turbine engine is also disclosed.

14 Claims, 5 Drawing Sheets

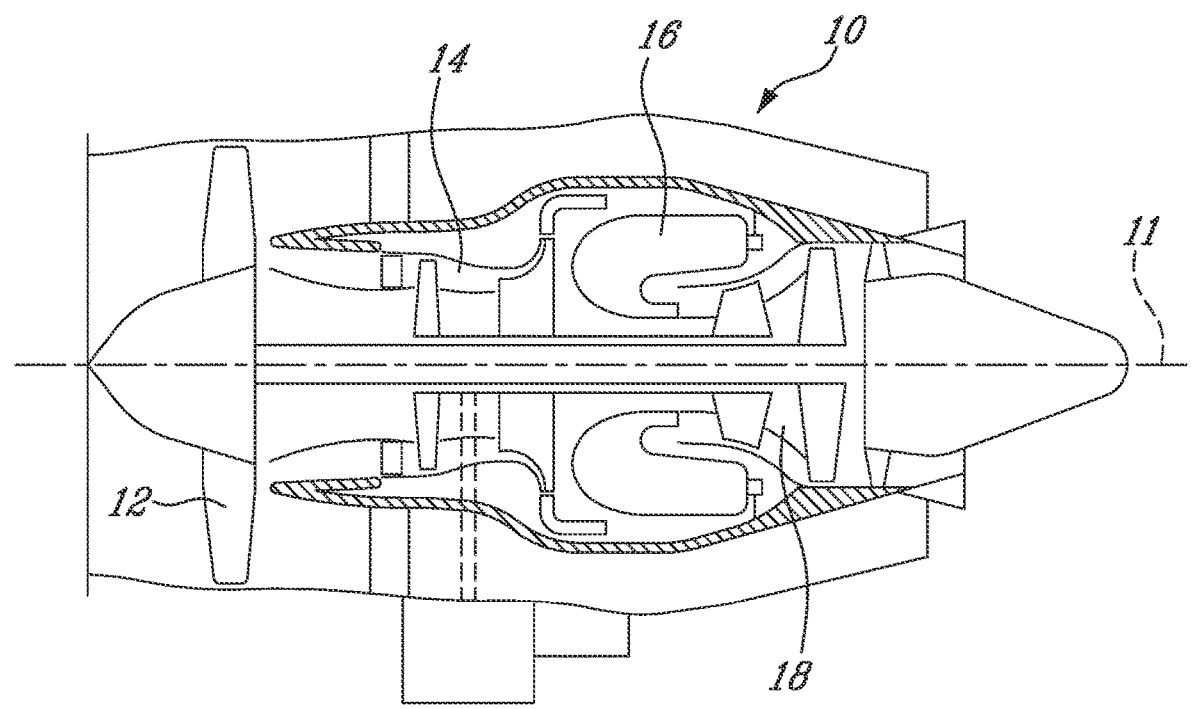
Fig_1A
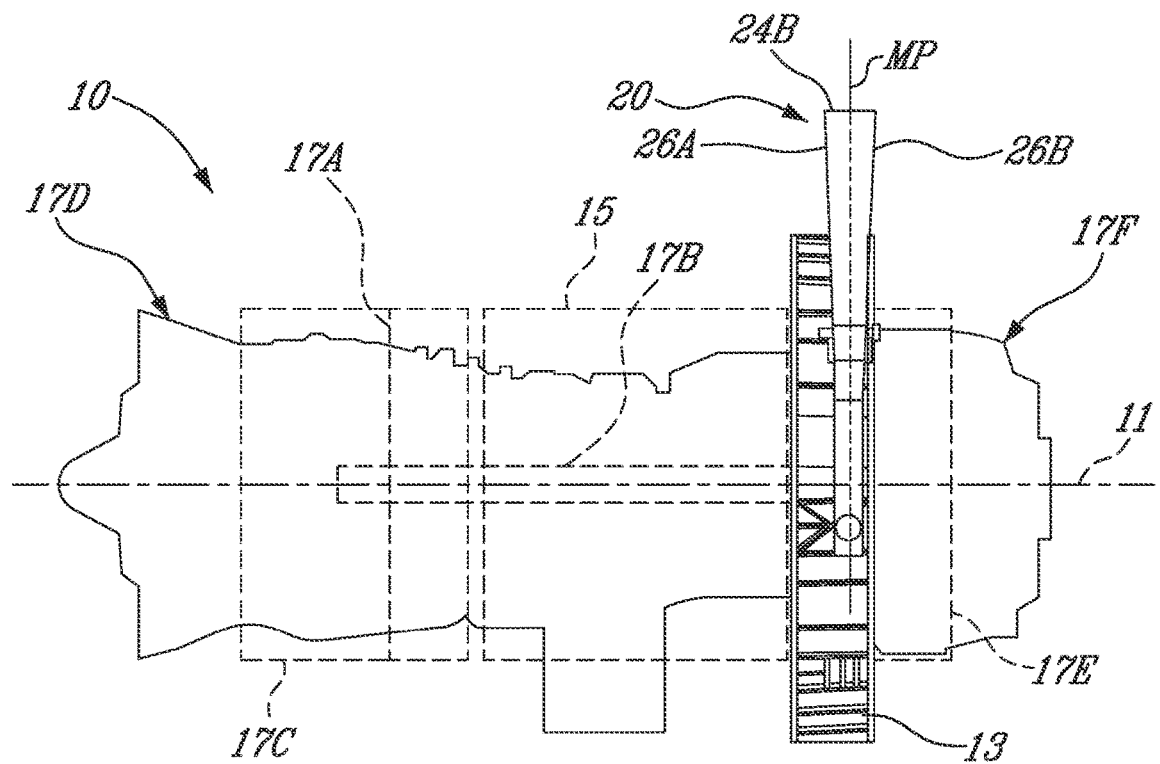
Fig_1B

GAS TURBINE ENGINE YOKE AND BUILD SUPPORT

TECHNICAL FIELD

The application relates generally to gas turbine engines and, more particularly, to supports for gas turbine engines.

BACKGROUND

Structures such as carriers are used to support components of gas turbine engines as the engine is being assembled and disassembled. Some carriers are bulky and occupy a lot of floor space, and do not permit easy access to the components of the engine. Some carriers do not allow for displacing the components, or changing their orientation.

SUMMARY

There is provided a gas turbine engine yoke comprising: an arcuate body mountable to a stand and rotatable between an upright orientation and a horizontal orientation, the arcuate body having an inner wall spaced apart from an outer wall and first and second side walls extending between the inner and outer walls, a mounting plane of the yoke extending through the inner and outer walls and positioned between the first and second side walls, engine attachments spaced apart along the inner wall and lying in the mounting plane.

There is provided a build support for a gas turbine engine, comprising: a stand; and a yoke supported by the stand and rotatable between an upright orientation and a horizontal orientation, the yoke having an inner wall spaced apart from an outer wall and first and second side walls extending between the inner and outer walls, a mounting plane of the yoke extending through the inner and outer walls and positioned between the first and second side walls, the yoke having engine attachments spaced apart along the inner wall and lying in the mounting plane.

There is provided a method of assembling a gas turbine engine, comprising: mounting a first component of the gas turbine engine to a yoke along attachment points lying in a single mounting plane defined by the yoke; rotating the yoke to rotate the first component between a horizontal orientation and an upright orientation; and mounting a second component of the gas turbine engine to the first component.

DESCRIPTION OF THE DRAWINGS

Reference is now made to the accompanying figures in which:

FIG. 1A is a schematic cross-sectional view of a gas turbine engine;

FIG. 1B is a side elevational view of a yoke for the gas turbine engine of FIG. 1A, parts of the gas turbine engine being shown;

DETAILED DESCRIPTION

Figure 2A:
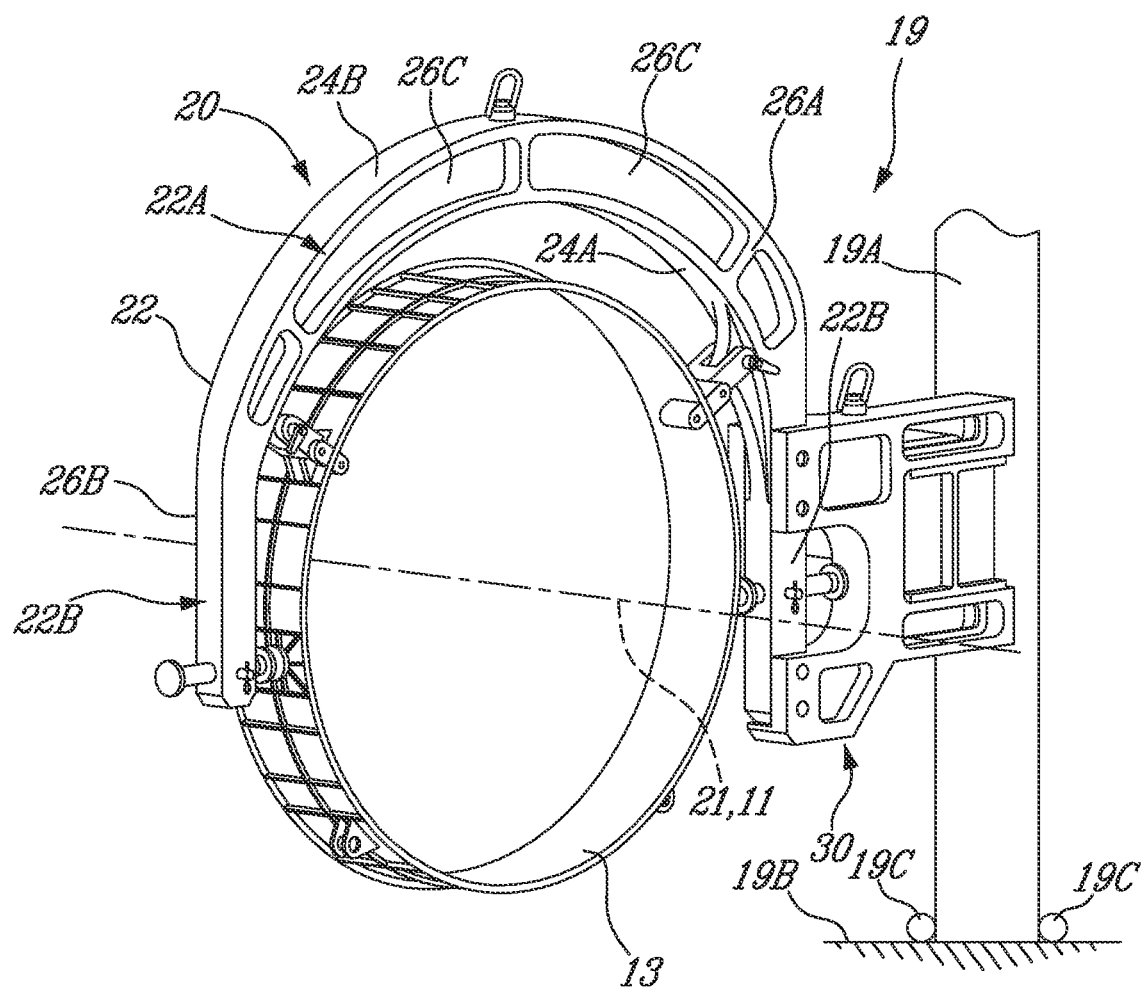
FIG. 2A is a perspective view of the yoke of FIG. 1B shown supporting a first component of the gas turbine engine of FIG. 1A.

FIG. 1A illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Components of the gas turbine engine 10 rotate about a longitudinal center axis 11 of the gas turbine engine 10.

FIG. 1B shows a gas turbine engine yoke 20. The gas turbine engine yoke 20 (sometimes referred to herein simply as "yoke 20") is a frame, harness or other suitable body used to support the gas turbine engine 10 and its components when the gas turbine engine 10 is being assembled and disassembled.

For example, and as shown in FIG. 1B, the yoke 20 supports a first component of the gas turbine engine 10 during assembly or build of the gas turbine engine 10. The first component in the embodiment shown in FIG. 1B is an intermediate case 13 of the gas turbine engine 10. Once the intermediate case 13 is supported by the yoke 20, other components of the gas turbine engine 10 can be assembled to the intermediate case 13. For example, and as shown in FIG. 1B, a second component of the gas turbine engine 10 mounted to the intermediate case 13 is a core assembly 15 of the gas turbine engine 10. In the depicted embodiment, the core assembly 15 includes a high pressure compressor, a diffuser, and a high pressure turbine. After the core assembly 15 has been mounted to the intermediate case 13, other components of the gas turbine engine 10 can be assembled. Some non-limiting examples of these other components which can be installed include the mid turbine frame (MTF) module 17A, the low pressure (LP) shaft assembly 17B, the low pressure turbine (LPT) module 17C, the turbine exhaust case (TEC) 17D, the low pressure bleed-off valve (LPBOV) module 17E, and the low pressure compressor (LPC) module 17F. Core externals may also be installed.

Referring to FIG. 2A, a build support 19 includes the yoke 20 and a stand 19A. The build support 19 is a structural assembly used to support components of the gas turbine engine 10 as it is being assembled and disassembled, and is thus an assembly/disassembly apparatus for the gas turbine engine 10. The stand 19A is a body or structure to which the yoke 20 is mounted. The stand 19A shown in FIG. 2A has a vertical orientation. The stand 19A is in the form of a vertical column in FIG. 2A which extends along an upright axis. The stand 19A rests on, and is supported by, a floor surface 19B, such as the internal floor surface of a manufacturing facility. In an embodiment, the stand 19A is a support post. In the depicted embodiment, the stand 19A is fixed in place on the floor surface 19B. In an alternate embodiment, the stand 19A is displaceable along the floor surface 19B, such as by using wheels 19C. Displacing the stand 19A may facilitate storage, and free up floor space.

Referring to FIG. 2A, the yoke 20 has a body 22 that forms the corpus of the yoke 20 and provides structure thereto. The body 22 includes an inner wall 24A spaced apart from an outer wall 24B, and first and second side walls 26A,26B which extend between the inner and outer walls 24A,24B. The inner wall 24A is the portion of the body 22 which is closest to the component of the gas turbine engine 10 supported by the yoke 20. The body 22 also defines a center line 21 of the yoke 20. The outer wall 24B is spaced outwardly from the inner wall 24A along a line being radial to the center line 21. The outer wall 24B is spaced radially outwardly from the inner wall 24A along a radial line from the center axis 11 of the gas turbine engine 10. In FIG. 2A, the center line 21 and the center axis 11 are collinear. The first and second side walls 26A,26B are spaced apart from each other along a line parallel to the center line 21 of the yoke 20. The distance separating the first and second side walls 26A,26B defines the thickness of the yoke 20. One or both of the first and second side walls 26A,26B have recessed regions 26C which reduce the thickness of the yoke 20 at the recessed regions 26C, and which also reduce the overall weight of the yoke 20. The body 22 in the depicted embodiment is made from aluminum. The body 22 in an embodiment is made entirely from aluminum.

Figure 5:
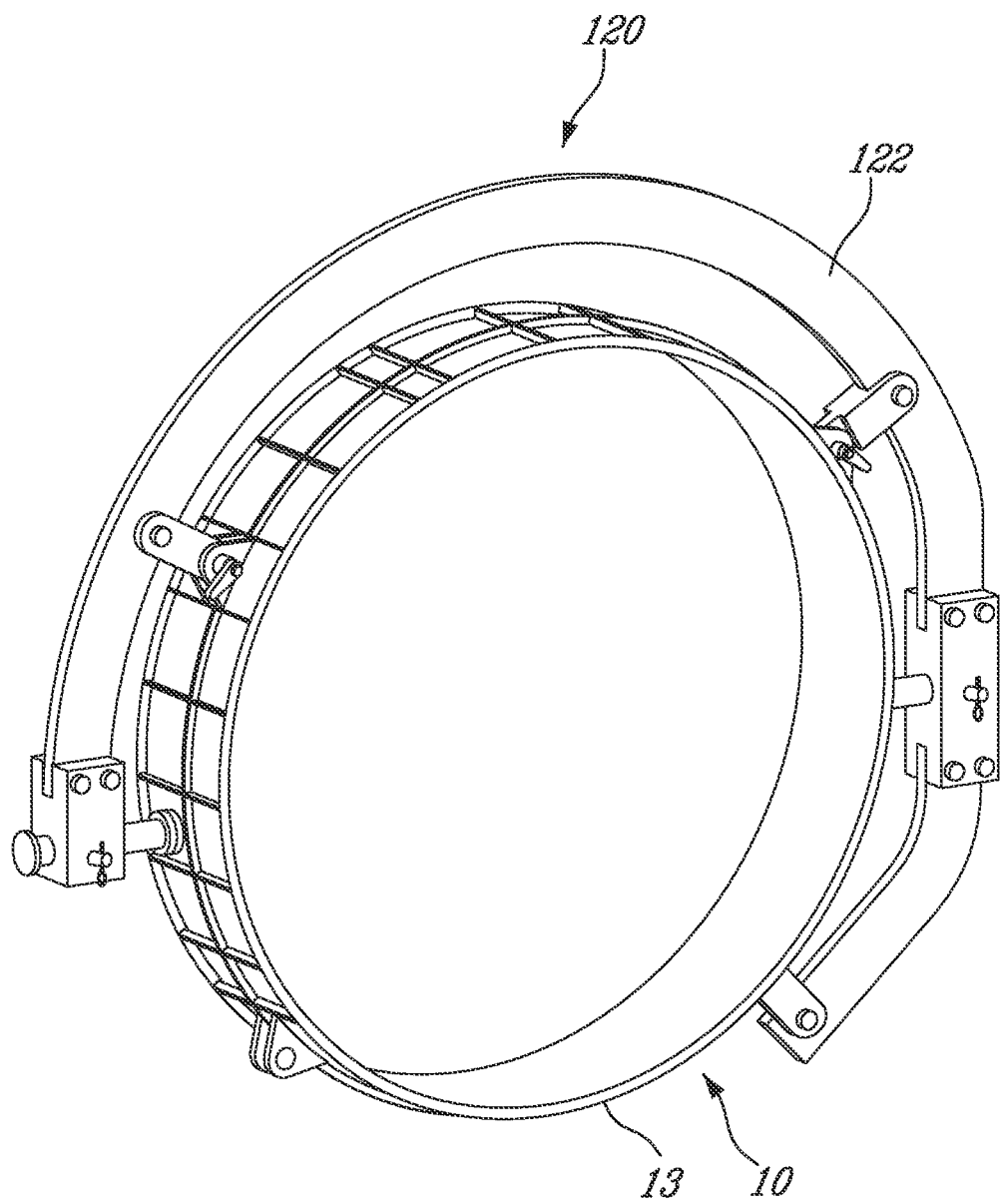
FIG. 5 is a perspective view of another yoke for the gas turbine engine of FIG. 1A.

The body 22 of the yoke 20 is arcuate. "Arcuate" indicates that at least some portion of the body 22 has a curvature. The inner and outer walls 24A,24B of the body 22 are curved along at least some of their length. In the embodiment of FIG. 2A, the body 22 has a curved segment 22A extending between opposed ends, and straight segments 22B which each extend from one of the ends of the curved segment 22A. The curved segment 22A has a greater curvature than the straight segments 22B. The straight segments 22B in an embodiment have zero curvature. The straight segments 22B define the distal ends of the yoke 20, and are disposed on opposite ends of the curved segment 22A. In the depicted embodiment, the outer wall 24B has a greater radius, measured from the center line 21 of the yoke 20, than the radius of the inner wall 24A. The yoke 20 in FIG. 2A thus forms a "horseshoe" shape, and may surround more than roughly half of a circumference of the gas turbine engine 10. Other shapes for the yoke 20 are possible. For example, FIG. 5 shows another yoke 120 whose body 122 surrounds roughly two-thirds of the circumference of the intermediate case 13 of the gas turbine engine 10.

Figure 2B:
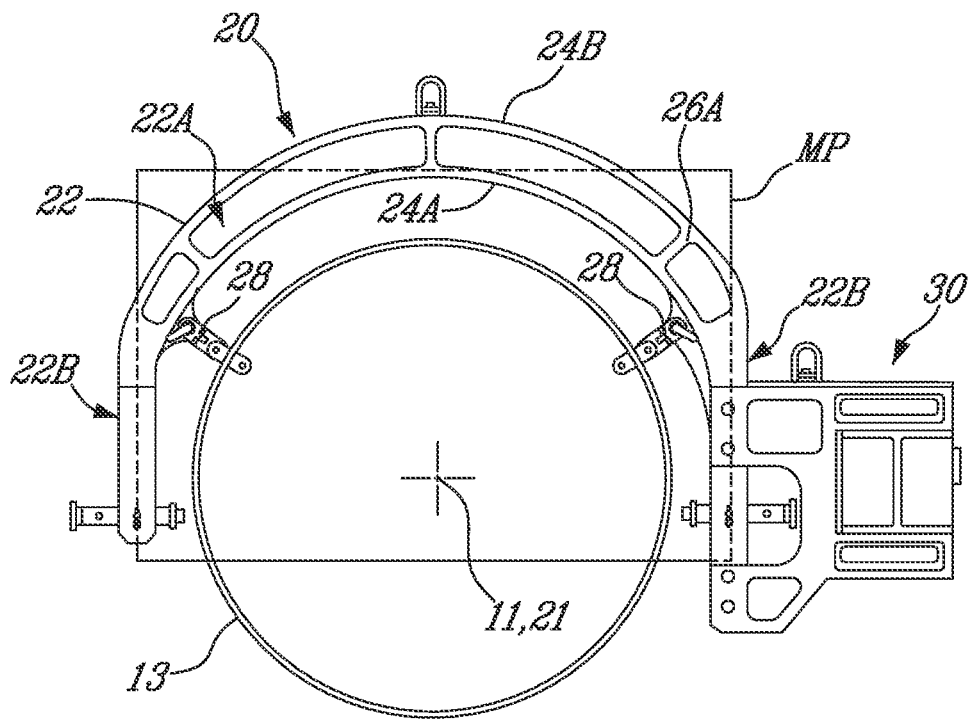
FIG. 2B is a front view of the yoke and the first component shown in FIG. 2A, both the yoke and the first component shown having a horizontal orientation.
Figure 2C:
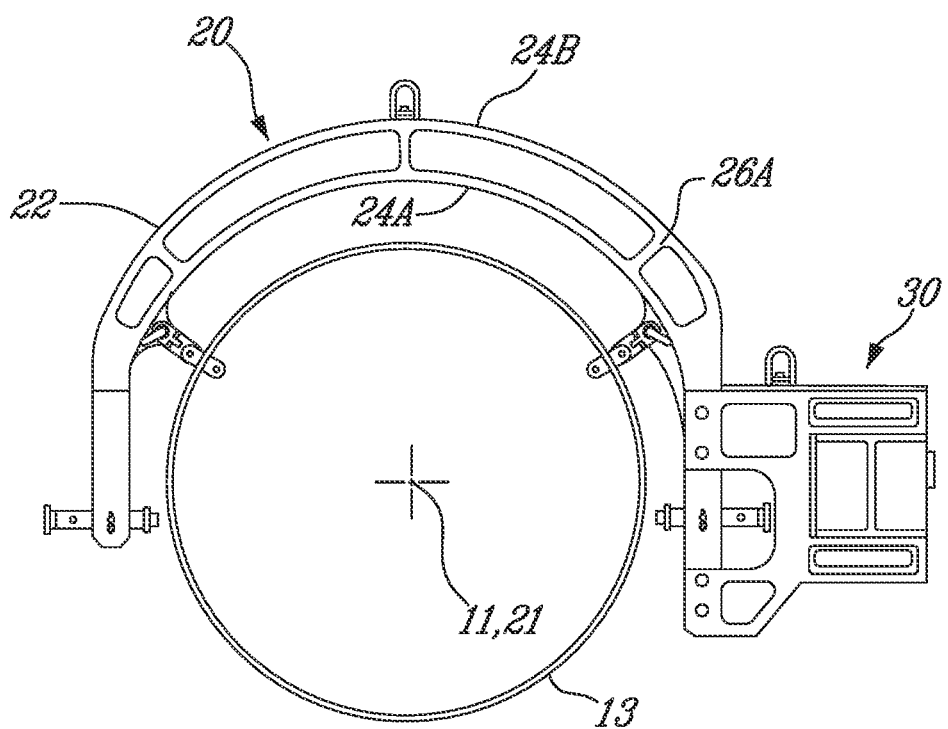
FIG. 2C is a top view of the yoke and the first component shown in FIG. 2A, both the yoke and the first component shown having an upright orientation.

Referring to FIGS. 2B and 2C, the yoke 20 is rotatable between a horizontal orientation (see FIG. 2B) and an upright orientation (see FIG. 2C). The yoke 20 and its body 22 are rotatable with respect to the stand 19A. In the horizontal orientation shown in FIG. 2B, the first and second side walls 26A,26B have an upright or vertical orientation. In the horizontal orientation, the outer wall 24B is above the inner wall 24A. When the yoke 20 is in the horizontal orientation, the center line 21 of the yoke 20 and the center axis 11 of the gas turbine engine 10 have a horizontal orientation and are parallel to the floor surface 19B. In the upright orientation shown in FIG. 2C, the first and second side walls 26A,26B have a horizontal orientation. In the upright orientation, the inner and outer walls 24A,24B have an upright or vertical orientation. When the yoke 20 is in the upright orientation, the center line 21 of the yoke 20 and the center axis 11 of the gas turbine engine 10 have an upright or vertical orientation and are normal to the floor surface 19B. The yoke 20 is also rotatable to any orientation between the horizontal and upright orientations, and may to held in that orientation to support the gas turbine engine 10. Regardless of the orientation of the yoke 20, the inner wall 24A remains the portion of the body 22 which is closest to the component of the gas turbine engine 10 supported by the yoke 20.

The body 22 of the yoke 20 defines a mounting plane MP, which is most easily visualized in FIG. 1B. The mounting plane MP, shown from the side in FIG. 1B, extends through the inner and outer walls 24A,24B of the body 22. The mounting plane MP is also located between the first and second side walls 26A,26B. All of the yoke 20 lies in the mounting plane MP, such that the mounting plane MP extends through the curved segment 22A and the straight segments 22B of the body 22. This is shown visually in FIGS. 1B, 2B and 3, where portions of the mounting plane MP which are outside the body 22 are shown in solid lines, and where portions of the mounting plane MP within the body 22 are shown in dashed lines. The body 22 of the yoke 20 is parallel to the mounting plane MP. As shown in FIG. 1B, the mounting plane MP is normal to the center axis 11 of the gas turbine engine 10 irrespective of the orientation of the gas turbine engine 10. The mounting plane MP is transverse to the center line 21 of the yoke 20 irrespective of the orientation of the yoke 20. The mounting plane MP is normal to the center line 21 of the yoke 20 irrespective of the orientation of the yoke 20. The mounting plane MP is spaced from both the first and second side walls 26A,26B in a direction inwardly into the body 22 of the yoke 20. The mounting plane MP lies in the thickness of the body 22. In FIG. 1B, the mounting plane MP is parallel to one or both of the first and second side walls 26A,26B. The mounting plane MP is normal to both the inner and outer walls 24A,24B of the body 22. In an embodiment, the mounting plane MP is defined by one of the first and second side walls 26A,26B. The mounting plane MP is shown from the front in FIG. 2B.

Referring to FIG. 2B, the yoke 20 has multiple engine attachments 28 which are attached to the yoke 20 and to the first component of the gas turbine engine 10, and thus help to mount the first component of the gas turbine engine 10 to the yoke 20, and help the yoke 20 to support the weight of the gas turbine engine 10 irrespective of its orientation. The engine attachments 28 therefore define points or positions at which the first component of the gas turbine engine 10 is joined to the yoke 20. The engine attachments 28 are spaced apart from each other along the inner wall 24A of the body 22. The engine attachments 28 are spaced apart from each other in a circumferential direction along the inner wall 24A of the body 22.

The engine attachments 28 lie in the mounting plane MP. It will thus be appreciated that the first component of the gas turbine engine 10 is mounted to the yoke 20 along a single plane of attachment (i.e. the mounting plane MP). The points of attachment of the first component to the yoke 20 are within the mounting plane MP defined by the yoke 20. The points of attachment of the yoke 20 to the first component are all within the thickness of yoke 20. This allows the yoke 20 to grab the intermediate case 13, for example, at different points all in the same mounting plane MP. Providing the points of attachment defined by the engine attachments 28 in a single plane helps to provide greater access to the first component and/or other components of the gas turbine engine 10 during its assembly, to all sides of these components, because no structure of the yoke 20 is hindering access. Having the engine attachments 28 in the same mounting plane MP frees up space around the yoke 20, improving accessibility to the gas turbine engine 10. This may allow greater access for technicians to flanges and horns of the first component and other components of the gas turbine engine 10, permitting them to build more freely, which may allow for less time when installing externally mounted hardware like wiring harness and tubes. In an embodiment, the engine attachments 28 seize the first component of the gas turbine engine 10 at the same locations on the first component where the aircraft supports the first component. The yoke 20 in such an embodiment is thus able to support the first component in the same plane as the aircraft does.

Figure 3:
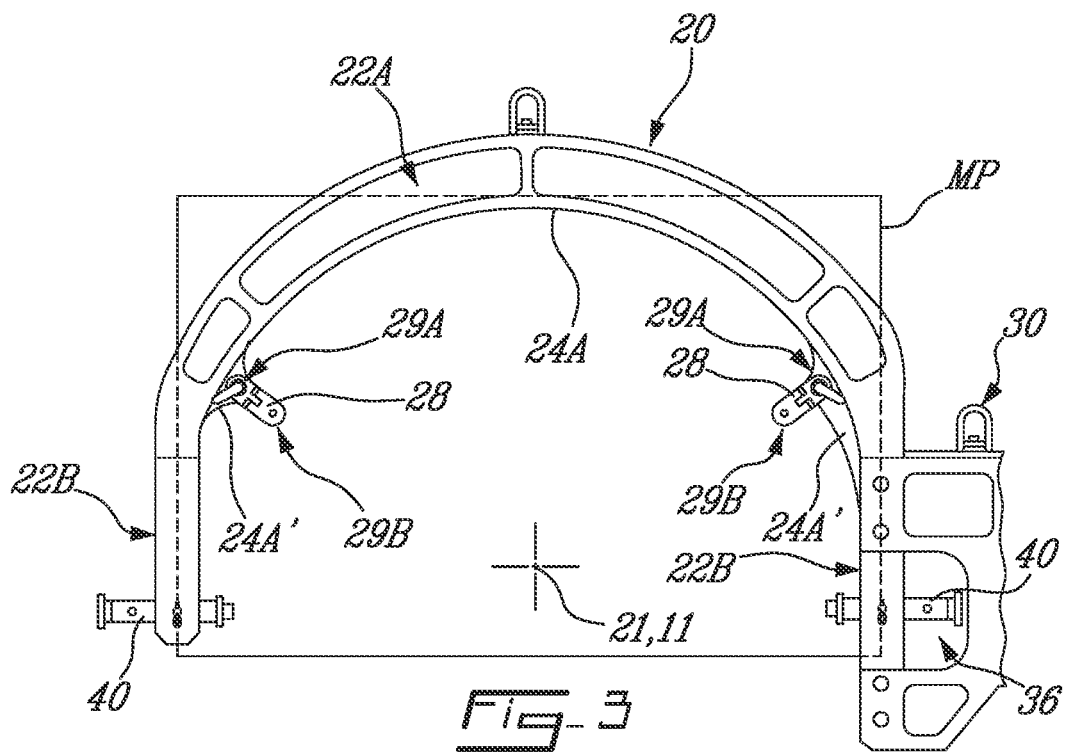
FIG. 3 is a front view of the yoke of FIG. 1B.

Referring to FIG. 3, the engine attachments 28 are shown as brackets. The brackets are selected at least in part based on the type of gas turbine engine 10 and/or its component to be supported by the yoke 20. Each of the engine attachments 28 have a first end 29A fixedly mounted to the inner wall 24A of the body 22, and a second end 29B fixedly mountable to the first component of the gas turbine engine 10, such as the horns of the intermediate case 13. It is understood by "fixedly mountable" and "fixedly mounted" that the engine attachments 28 prevent relative displacement or relative rotation between themselves and the objects to which they are attached. Therefore, the engine attachments 28 prevent a pivoting or rotating motion of the first component relative to the yoke 20. The engine attachments 28 are thus "antirotation" features, which may be helpful when rotating the yoke 20 and the gas turbine engine 10 between the horizontal and upright orientations. In FIG. 3, the first end 29A of each engine attachment is fixedly mounted to a flange 24A' extending inwardly toward the center line center line 21 of the yoke 20 from the inner wall 24A. The flanges 24A' have a mounting hole through which the first end 29A of the engine attachments 28 are secured. In FIG. 3, all of the engine attachments 28 are circumferentially spaced apart along the inner wall 24A of the curved segment 22A. In FIG. 3, the straight segments 22B are free of engine attachments 28. The engine attachments 28 extend between the first and second ends 29A,29B, and an entirety of the engine attachments 28 lie in the mounting plane MP, as shown in FIG. 3.

Figure 4:
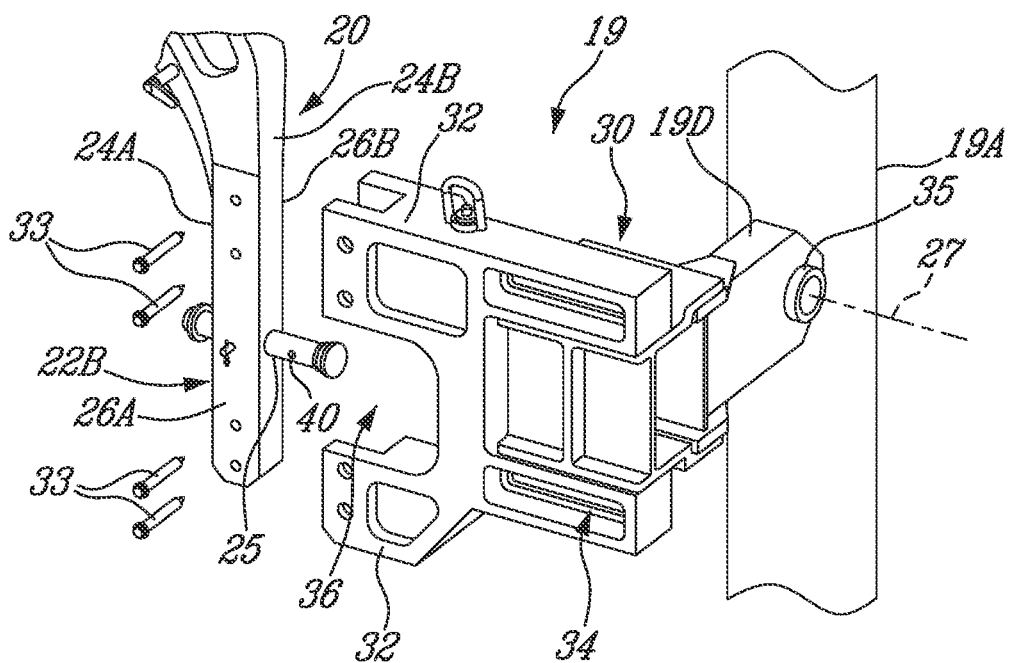
FIG. 4 is an exploded view of part of the yoke of FIG. 1B and an adapter.

Referring to FIG. 4, the build support 19 also has an adapter 30 that is removably mountable to the yoke 20, and removably mounted to the stand 19A. The adapter 30 is thus positioned between the yoke 20 and the stand 19A. More particularly, the adapter 30 helps to suspend the yoke 20 from the stand 19A, and thus forms with the yoke 20 an assembly cantilevered from the stand 19A. The adapter 30 may be removed from both the yoke 20 and the stand 19A, and may also be secured thereto. The removability of the adapter 30 allows the build support 19 to be more easily disassembled, such that the yoke 20 and the stand 19A may be displaced to another location. The removability of the adapter 30 also helps with storage of the components of the build support 19. Thus, the fact that the adapter 30 is not permanently fastened to the yoke 20 or to the stand 19A allows the build support 19 to be dismounted relatively easily in order to maximise floor space and versatility. For example, the adapter 30 allows another yoke 20, such as a second yoke 20 different from the one shown in the depicted embodiment, to be used with the same stand 19A. The adapter 30 thus allows the build support 19 to use multiple yokes 20 interchangeably. It will be appreciated that using the same adapter 30 with different types of yokes 20 allows the build support 19 to support different models of gas turbine engines 10. The adapter 30 is rotatable with the yoke 20 between the horizontal and upright orientations. The adapter 30 is rotatable with respect to the stand 19A.

Many configurations of the adapter 30 are possible and within the scope of the present disclosure to achieve the functionality described above. One possible example of the configuration of adapter 30 is now described in greater detail with reference to FIG. 4. The adapter 30 has arm portions 32, each of which engage the first and second side walls 26A,26B of the body 22 of the yoke 20. The arm portions 32 are secured to the first and second side walls 26A,26B with any suitable fastener 33. The adapter 30 has a mounting portion 34 which is mounted to part of the stand 19A and secured thereto. In FIG. 4, the mounting portion 34 is secured to a rotatable arm 19D of the stand 19A. The rotatable arm 19D defines an axis of rotation 27, about which the adapter 30 and the yoke 20 rotate between the horizontal and upright positions. In FIG. 4, the axis of rotation 27 of the adapter 30 and of the yoke 20 is defined by a bushing 35 in the rotatable arm 19D of the stand 19A. The adapter 30 in the depicted embodiment is made of aluminum. The adapter 30 may be mounted to a portable or displaceable stand 19A.

Additional mounts or objects may be used to further secure the yoke 20 to the first component of the gas turbine engine 10. Referring to FIGS. 3 and 4, trunnions 40 are used with the yoke 20 to further secure the gas turbine engine 10 to the yoke 20. The yoke 20 has holes 25 extending through the yoke 20 between the inner and outer walls 24A,24B. The holes 25 in FIGS. 3 and 4 are located at the distal ends of the body 22. The holes 25 in FIGS. 3 and 4 are present in only the straight segments 22B of the body 22. Each trunnion 40 is displaceable through one of the holes 25 to engage and support part of the first component of the gas turbine engine 10. In FIGS. 3 and 4, the trunnions 40 are displaceable along a line being radial to the center line 21 of the yoke 20. In FIGS. 3 and 4, the trunnions 40 are displaceable along a line being radial to the center axis 11 of the gas turbine engine 10. The trunnions 40 thus extend and retract to engage the first component, such as by engaging the intermediate case 13 in an appropriate location, such as a thrust bearing. The trunnions 40 are thus positioned along the yoke 20 to mimic how the gas turbine engine 10 is supported by the aircraft. The displaceability of the trunnions 40 allows for them to accommodate different engine sizes. In FIGS. 3 and 4, the adapter 30 has a recess 36 delimited by the arm portions 32. The trunnions 40 are displaceable into and out of the recess 36. The adapter 30 is thus designed to allow for the trunnion 40 to be fully retracted on one side of the yoke 20. The trunnions 40 may be secured in their position using any suitable technique, including for example with a pin 42.

Referring to FIG. 2A, a method of assembling the gas turbine engine 10 is also disclosed. The method includes mounting the first component of the gas turbine engine 10 to the yoke 20,120 along attachment points (e.g. the engine attachments 28) which lie in the single mounting plane MP defined by the yoke 20,120. The method includes rotating the yoke 20,120 to rotate the first component between the horizontal orientation and the upright orientation. The method also includes mounting another, second component of the gas turbine engine 10 to the first component. The method also applies mutatis mutandis to the disassembly of the gas turbine engine 10.

In an embodiment, mounting the first component includes mounting the intermediate case 13 to the yoke 20, 120, and mounting the second component includes mounting the core assembly 15 to the intermediate case 13. Referring to FIG. 1B, after the core assembly 15 has been mounted to the intermediate case 13, other components of the gas turbine engine 10 can be assembled, such as the mid turbine frame (MTF) module 17A, the low pressure (LP) shaft assembly 17B, the low pressure turbine (LPT) module 17C, the turbine exhaust case (TEC) 17D, the low pressure bleed-off valve (LPBOV) module 17E, and the low pressure compressor (LPC) module 17F. Core externals may also be installed.

In an embodiment, the process of assembling the gas turbine engine 10 begins by installing the intermediate case 13 into the yoke 20,120, and then mating the core assembly 15 to the intermediate case 13. If the yoke 20,120, and thus the intermediate case 13, are in the horizontal orientation, the core assembly 15 may be mated to the intermediate case 13 using a chain lift or ground-based tooling. If the yoke 20,120, and thus the intermediate case 13, are in the upright orientation, the core assembly 15 may be mated to the intermediate case 13 using a chain lift or ground-based tooling. If the core assembly 15 is installed vertically without the MTF module 17A, the MTF module 17A may then be installed while the gas turbine engine 10 remains in the upright orientation, via the chain lift. After the MTF module 17A installation, the gas turbine engine 10 may be rotated to the horizontal orientation, and the build can continue, such as by installing the LP Shaft assembly 17B, the LPT module 17C, the LPBOV module 17E, and the TEC 17D. Similarly, if the yoke 20,120, and thus the intermediate case 13, are in the horizontal orientation, the core assembly 15 can be mated to the intermediate case 13 using a core cart.

The build support 19 and its yoke 20 disclosed herein allow for assembly/disassembly of the gas turbine engine 10 without being completely reliant on an immobile carrier, while using existing infrastructure such as the stand 19A. The build support 19 helps to reduce the utilization of expensive carrier infrastructure to progress the build of the gas turbine engine 10 past the MTF module 17A mating with the core assembly 15.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A build support for a gas turbine engine, comprising:
    a stand;
    a yoke supported by the stand and rotatable between an upright orientation and a horizontal orientation, the yoke having an inner wall spaced apart from an outer wall and first and second side walls extending between the inner and outer walls, a mounting plane of the yoke extending through the inner and outer walls and positioned between the first and second side walls, the yoke having engine attachments spaced apart along the inner wall and lying in the mounting plane; and
    an adapter removably mounted to the yoke and to the stand, the adapter being rotatable between the upright orientation and the horizontal orientation.

2. The build support of claim 1, wherein the mounting plane is parallel to one or both of the first and second side walls.

3. The build support of claim 1, comprising a second yoke different from the yoke, the adapter mountable separately to each of the second yoke and the yoke.

4. The build support of claim 1, wherein the engine attachments have a first end fixedly mounted to the inner wall of the yoke and a second end fixedly mountable to the gas turbine engine, the engine attachments extending between the first and second ends and an entirety of the engine attachments lying in the mounting plane.

5. The build support of claim 1, wherein the yoke has holes extending through the yoke between the inner and outer walls, the build support having trunnions displaceable through the holes to engage the gas turbine engine.

6. The build support of claim 1, wherein the stand is displaceable along a floor surface.

7. The build support of claim 1, wherein the yoke has a curved segment extending between ends thereof, and straight segments each extending from one of the ends of the curved segment.

8. The build support of claim 7, wherein the engine attachments are spaced apart along the inner wall of the curved segment.

9. The build support of claim 1, wherein the yoke has an arcuate body mountable to the stand and rotatable between the upright orientation and the horizontal orientation, the arcuate body having the inner wall spaced apart from the outer wall and the first and second side walls extending between the inner and outer walls.

10. A build support for a gas turbine engine, comprising:
    a stand;
    a yoke supported by the stand and rotatable between an upright orientation and a horizontal orientation, the yoke having an inner wall spaced apart from an outer wall and first and second side walls extending between the inner and outer walls, a mounting plane of the yoke extending through the inner and outer walls and positioned between the first and second side walls, the yoke having engine attachments spaced apart along the inner wall and lying in the mounting plane, wherein the yoke has holes extending through the yoke between the inner and outer walls; and
    trunnions displaceable through the holes to engage the gas turbine engine.

11. The build support of claim 10, wherein the mounting plane is parallel to one or both of the first and second side walls.

12. The build support of claim 10, further comprising an adapter removably mounted to the yoke and to the stand, the adapter rotatable between the upright orientation and the horizontal orientation.

13. The build support of claim 10, comprising a second yoke different from the yoke, the adapter mountable separately to each of the second yoke and the yoke.

14. The build support of claim 10, wherein the engine attachments have a first end fixedly mounted to the inner wall of the yoke and a second end fixedly mountable to the gas turbine engine, the engine attachments extending between the first and second ends and an entirety of the engine attachments lying in the mounting plane.

* * * * *